US011494219B2

(12) United States Patent
Pascual (10) Patent No.: US 11,494,219 B2
(45) Date of Patent: Nov. 8, 2022

(54) ENCRYPTION AND REMOTE ATTESTATION OF CONTAINERS (71) Applicant: Red Hat, Inc., Raleigh, NC (US)

(72) Inventor: Sergio Lopez Pascual, Madrid (ES)

(73) Assignee: Red Hat, Inc., Raleigh, NC (US)

( * ) Notice: Subject to any disclaimer, the term of this patent is extended or adjusted under 35 U.S.C. 154(b) by 435 days.

(21) Appl. No.: 16/801,698

(22) Filed: Feb. 26, 2020

(65) Prior Publication Data

US 2021/0263759 A1 Aug. 26, 2021

(51) Int. Cl.
G06F 9/455 (2018.01)
G06F 12/14 (2006.01)
G06F 21/60 (2013.01)
H04L 9/32 (2006.01)
H04L 9/08 (2006.01)

(52) U.S. Cl.
CPC ...... *G06F 9/45558* (2013.01); *G06F 12/1408* (2013.01); *G06F 21/602* (2013.01); *H04L 9/0825* (2013.01); *H04L 9/3263* (2013.01); G06F 2009/45562 (2013.01); G06F 2009/45575 (2013.01); G06F 2009/45583 (2013.01); G06F 2009/45587 (2013.01)

(58) Field of Classification Search
CPC ............ G06F 9/45558; G06F 12/1408; G06F 21/602; G06F 21/57; G06F 2009/45562; G06F 2009/45575; G06F 2009/45583; G06F 2009/45587

See application file for complete search history.

(56) References Cited

U.S. PATENT DOCUMENTS

| 9,009,471 | B2* | 4/2015 | Korthny | G06F 9/45545 |
| | | | | 718/1 |
| 2011/0246767 | A1* | 10/2011 | Chaturvedi | G06F 9/45558 |
| | | | | 718/1 |
| 2018/0285140 | A1* | 10/2018 | Kaplan | G06F 9/45558 |
| 2019/0268318 | A1 | 8/2019 | Tsirkin | |
| 2020/0403784 | A1* | 12/2020 | Rodriguez | H04L 9/0894 |
| 2021/0173950 | A1* | 6/2021 | Kwak | H04L 9/0643 |
| 2021/0247994 | A1* | 8/2021 | Patil | H04L 63/0428 |

OTHER PUBLICATIONS

Secure Encrypted Virtualizaiton API Version 0.22 Technical Preview; Advanced Micro Devices; Jul. 2019 (105 pages).

(Continued)

*Primary Examiner* — Emerson C Puente
*Assistant Examiner* — Zhi Chen
(74) *Attorney, Agent, or Firm* — K&L Gates LLP (57) ABSTRACT

Systems and methods are presented for creating encrypted containers in cloud computing environments. In one embodiment, a method is provided that includes receiving a request to create a virtual machine at an application node. The request may contain encryption parameters for use in encrypting the virtual machine. The virtual machine may be created at the application node and may include an associated memory for use during execution of the virtual machine. An encryption key may be received and the memory may be encrypted. An encrypted container image and may be mounted within the virtual machine. The encrypted container image may be executed within the virtual machine.

18 Claims, 7 Drawing Sheets

(56) References Cited

OTHER PUBLICATIONS

Larrew, Jesse; [kata-dev] Kata with AMD Secure Encrypted Virtualization (SEV); lists.katacontainers.io/pipermail/kata-dev/2018-February/000029.html; retrieved Oct. 23, 2019 (4 pages).

Thigle, Vardhan et al.; Trust and Integrity in the Cloud—Manage your secure containers with Fortanix RTE; https://fortanix.com/blog/2019/08/trust-and-integrity-in-the-cloud-manage-your-secure-containers-with-fortanix-rte/; 2019; retrieved Oct. 23, 2019 (8 pages).

AMD Memory Encryption Tutorial; ISCA 2016; Jun. 19, 2016; (82 pages).

* cited by examiner

ENCRYPTION AND REMOTE ATTESTATION OF CONTAINERS

BACKGROUND

Computing systems may rely on cloud computing environments to execute one or more functions and/or to provide computing services. Cloud computing environments may provide computing resources that can be used by the computing systems to execute the functions and/or computing services. In particular, the cloud computing environments may allocate a portion of the computing resources (e.g., processing, storage, input/output resources) to execute requested functions and/or computing services.

SUMMARY

The present disclosure presents new and innovative systems and methods for creating encrypted containers in cloud computing environments. In one embodiment, a method is provided that includes receiving, at an application node of a cloud computing environment, a request to create a virtual machine at the application node, the request containing encryption parameters for use in encrypting the virtual machine. The virtual machine may be created at the application node and may include an associated memory for use during execution of the virtual machine. The method may further include receiving, at the application node, an encryption key, encrypting the memory, and receiving an encrypted container image. The encrypted container image may be encrypted using the encryption key. The encrypted container image may be mounted within the virtual machine and the encrypted container image may be executed within the virtual machine.

In another embodiment, a method is provided that includes transmitting, to an application node of a cloud computing environment, a request to create a virtual machine at the application node. The request may contain encryption parameters for use in encrypting the virtual machine. The method may also include receiving, from the application node, an attestation indicating that the virtual machine has been created and encrypted, at least in part, and validating the attestation. The method may further include generating an encryption key for use in encrypting a memory associated with the virtual machine and transmitting the encryption key to the application node. The method may still further include transmitting, to the virtual machine, an encrypted container image for execution within the virtual machine.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Applications executing within cloud environments may typically execute within containers of the cloud environment. For example, the containers may be allocated memory capacity, processing capacity and/or other computing resources to execute applications. In practice, a single cloud environment may include many containers executing applications from multiple different entities. For example, different individuals and/or companies may provide applications to a cloud environment for execution. Applications from different entities may execute in different containers. However, applications from different entities may, in certain instances, execute on the same computing device (e.g., the same computing node) as one another. In such situations, it may be possible for applications executing in certain containers to access memory and other computing resources associated with other containers. Such access may compromise confidential information stored within the containers. For example, an application associated with one entity may be able to access data stored within a container executing an application associated with another entity. Therefore, there exists a need to ensure that data stored within containers is not accessible to other containers executing on the same computing node.

In certain instances, cloud computing environment (e.g., a Red Hat® OpenShift computing environment) may restrict access to computing resources (e.g., memory sectors, processing cores, and/or storage sectors) associated with a container to applications executing within that container. However, nefarious applications may still be able to access restricted computing resources. For example, an application may be able to access data stored within a restricted memory sector by causing a memory leak that overflows into a restricted memory sector associated with another application's container, thereby granting access to the application. In further instances, entities may create private cloud computing environment that utilize only computing nodes associated with a particular entity. For example, the particular entity may create a private cloud computing environment by running private computing nodes. As another example, the particular entity may secure exclusive access to particular computing nodes within an otherwise public cloud computing environment. However, these solutions reduce the efficiency of the overall resource utilization within the cloud computing environment, as computing nodes exclusively associated with a single entity may be less able to fully utilize their computing resources. Additionally, initializing private computing nodes may be unduly burdensome for many entities seeking to ensure privacy of data stored within containers.

One solution to the above problems is to create containers (e.g., a Kata Container) that are fully encrypted, including encryption of the data stored within a storage space of the container and encryption of data stored within a memory of the container. The containers may execute within virtual machines (e.g., KVM virtual machines, QEMU virtual machines) In particular, the memory may be encrypted using hardware-based memory encryption techniques. For example, after receiving a request to create a container, the request may be forwarded to an application node, which may create and encrypt a virtual machine for executing the container. An encryption key may then be generated and provided to a registry storing the container image for execution. The container image may be encrypted using the encryption key and the encrypted container image may be provided to the application node for execution. The encryption key may be further forwarded to the application node, which may use the encryption key to decrypt the encrypted container image. The application node may then mount the container image within the virtual machine and may execute the container image within the virtual machine. Because the virtual machine is encrypted (e.g., the memory and storage associated with the virtual machine are encrypted), the container image can be executed within the virtual machine while protecting the privacy and confidentiality of data stored and utilized therein. In particular, even if a nefarious application were to gain access to the memory associated with the virtual machine, the nefarious application would be unable to determine the contents of the memory, because the virtual machines and the memory are encrypted. Therefore, creating and executing containers in this way enables the containers to execute in a public cloud computing environment while also ensuring that the data stored within the containers is protected from access by other applications and/or entities.

Figure 1:
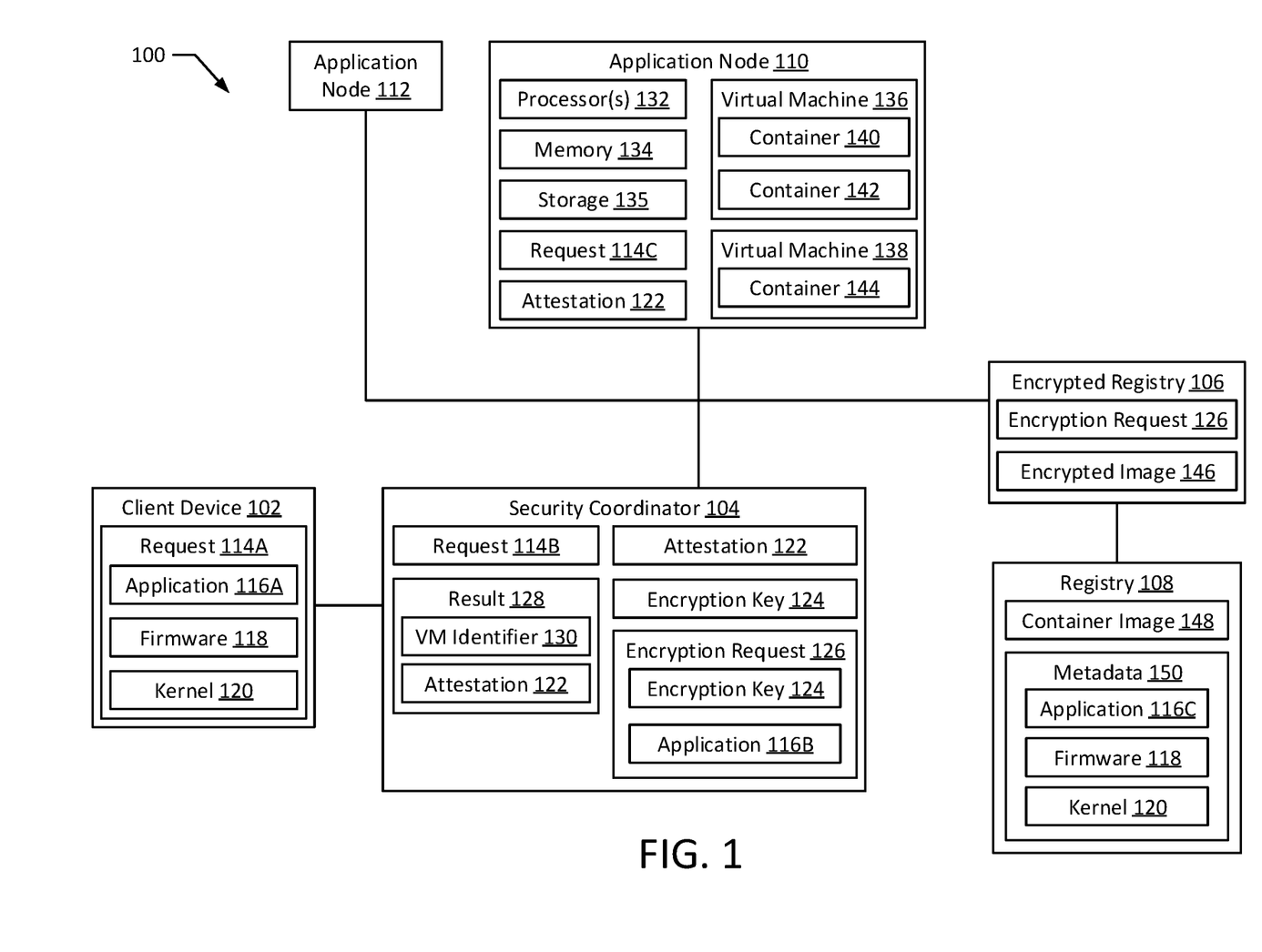
FIG. 1 illustrates a system for generating encrypted containers according to an exemplary embodiment of the present disclosure.

FIG. 1 illustrates a system 100 for generating encrypted containers according to an exemplary embodiment of the present disclosure. The system 100 may be configured to implement a cloud computing environment and may create and execute containers within encrypted virtual machines (VMs). The system 100 includes a client device 102, a security coordinator 104, and encrypted registry 106, a registry 108, and application nodes 110, 112.

The client device 102 may be a computing device associated with a client (e.g., a user, a customer) of the cloud computing environment. For example, the client device 102 may transmit requests to the cloud computing environment to execute particular applications. In particular, the client device 102 may transmit a request 114A including an application 116A for execution, a firmware 118 required for execution of the application 116A, and a kernel 120 required for execution of the application 116A. In particular, the application 116A may execute within a particular operating system (e.g., a Linux operating system, such as Red Hat® Enterprise Linux). In such instances, the firmware 118 may specify a particular firmware (e.g., a particular version of a firmware) required for proper execution of the application 116A and the kernel 120 may specify a particular kernel (e.g., a particular version of a kernel) required for proper execution of the application 116A. The client device 102 may transmit the request 114A to a security coordinator 104 of the cloud computing environment.

The security coordinator 104 may be configured to receive and process requests 114B from client devices 102 and may forward the requests to application nodes 110, 112 of the computing environment for execution. For example, the security coordinator 104 may receive the request 114B and may forward the request to an application node 110 for execution of the application 116A (e.g., to an application node best suited to execute the application 116A).

The system 100 may include multiple application nodes 110, 112. The application nodes 110, 112 may be configured to execute applications on behalf of client devices 102. For example, the application nodes 110, 112 may be configured to execute applications within containers 140, 142, 144 and/or virtual machines 136, 138. As a specific example, the application node 110 includes processor(s) 132, memory 134, and storage 135. The processor(s) 132, memory 134, and storage may be allocated to the virtual machines 136, 138 and containers 140, 142, 144 for use during execution. The storage 135 may be configured for longer-term storage of data (e.g., on a storage drive such as a hard disk drive and/or a solid state drive). The memory 134 may be configured for shorter-term storage of data (e.g., on random access memory (RAM)) for use when executing the containers 140, 142, 144. The application nodes 110, 112 may execute applications using the virtual machines 136, 138 and/or containers 140, 142, 144 according to requests received from client devices 102. In particular, the application node 110 may receive the request 114C from the security coordinator 104. In response to receiving the request 114C, the application node 110 may create a virtual machine 138 for execution of the application 116A identified within the request 114C. The virtual machine 138 may be encrypted. In particular, the portions of the memory 134 and/or the storage 135 may be encrypted using an encryption key uniquely associated with the virtual machine 138, as discussed further below. In certain instances, when initially creating the virtual machine 138, the virtual machine 138 may not contain the container 144. In additional or alternative implementations, rather than executing within a virtual machine 136, 138, the containers 140, 142, 144 may be executed within a pod (e.g., a pod of containers).

After creating the virtual machine 138, the application node 110 may generate an attestation 122. The attestation 122 may be generated based on the created virtual machine 138 and may computationally prove that the virtual machine 138 was successfully created and encrypted. In particular, the attestation 122 may be generated to computationally prove (e.g., cryptographically demonstrate) that at least one of the memory 134 and storage 135 associated with the virtual machine 138 has been successfully encrypted. In certain implementations, the attestation 122 may be generated according to one or more cryptographic certification protocols, such as the X.509 protocols. The attestation 122 may then be transmitted to the security coordinator 104, which may receive and validate the attestation 122 to ensure that the virtual machine 138 has been successfully created.

The security coordinator 104 may also be configured to coordinate the encryption and transmission of container images required for execution by the application nodes 110, 112. For example, the security coordinator 104 may generate an encryption request 126 containing an encryption key 124 and an identifier of the application 116B specified in the request 114B. The security coordinator 104 may transmit the encryption request 126 to the encrypted registry 106.

The encrypted registry 106 may be configured to retrieve and encrypt container images 148 from the registry 108. The registry 108 may store multiple container images 148 along with associated metadata 150. The metadata 150 may indicate one or more of an application 116C associated with the container image 148, a firmware 118 associated with the container image 148, and/or a kernel 120 associated with the container image 148. The encrypted registry 106 and/or the registry 108 may identify the container image 148 stored within the registry 108 with associated metadata 150 indicating the application 116C included within the encryption request 126. Additionally or alternatively, a corresponding container image 148 may be identified based on the firmware 118 and/or the kernel stored within the associated metadata 150. For example, in addition to the application 116B, the encryption request 126 may identify the firmware 118 and/or the kernel 120 included within the request 114A. The encrypted registry 106 and/or the registry 108 may therefore identify the corresponding container image 148 based on metadata 150 including the firmware 118 and/or the kernel 120 identified in the encryption request 126.

The encrypted registry 106 may then receive the container image 148 and may encrypt the container image 148 to generate the encrypted image 146. In particular, the encrypted registry 106 may encrypt the container image 148 using the encryption key 124 included within the encryption request 126 to generate the encrypted image 146. The encrypted registry 106 may then transmit the encrypted image 146 to the application node 110. The application node 110 may mount the encrypted image 146 within the virtual machine 138 for execution. For example, the security coordinator 104 may transmit the encryption key 124 to the application node 110. The application node 110 may use the encryption key 124 to decrypt the encrypted image 146 and access the container image 148. The application node 110 may then mount the container image 148 within the virtual image 138 (e.g., as the container 144). Because the virtual machine 138 is encrypted, by mounting the container image 148 within the virtual machine 138, the contents of the virtual machine 138 and thereby the contents of the container 144 are encrypted, protecting any data stored or utilized therein. The application node 110 may therefore proceed with executing the application 116A within the container 144.

Upon successfully mounting the container image 148 within the virtual machine 138, the application node 110 may transmit a VM identifier 130 to the security coordinator 104. The security coordinator 104 may then generate a result 128 containing the VM identifier 130 and the attestation 122. The result 128 may be transmitted to the client device 102. Upon receiving the result 128, the client device 102 may validate the attestation 122 to verify that the virtual machine 138 has been successfully created and encrypted. The client device 102 may also utilize the VM identifier 130 to track and/or monitor the virtual machine 138 used to execute the application 116A.

One or more of the client device 102, the security coordinator 104, the encrypted registry 106, the registry 108, and the application nodes 110, 112 may be implemented by a computer system. For example, the processor(s) 132 and the memory 134 may implement one or more operational features of the application node 110. As a specific example, the memory 134 may store instructions which, when executed by one or more of the processor(s) 132, may cause the processor(s) 132 to perform one or more of the operational features of the application node 110. Although not depicted, the client device 102, the security coordinator 104, the encrypted registry 106, the registry 108, and/or the application node 112 may similarly include processors and/or memories configured to implement one or more of their operational features. As a further example, one or more of the security coordinator 104, the encrypted registry 106, and the registry 108 may be implemented by an application node 110, 112 of the cloud computing environment. For example, the security coordinator 104, the encrypted registry 106, and/or the registry 108 may execute as one or more applications implemented at least in part by one or more application nodes 110, 112 of the cloud computing environment.

Figure 2:
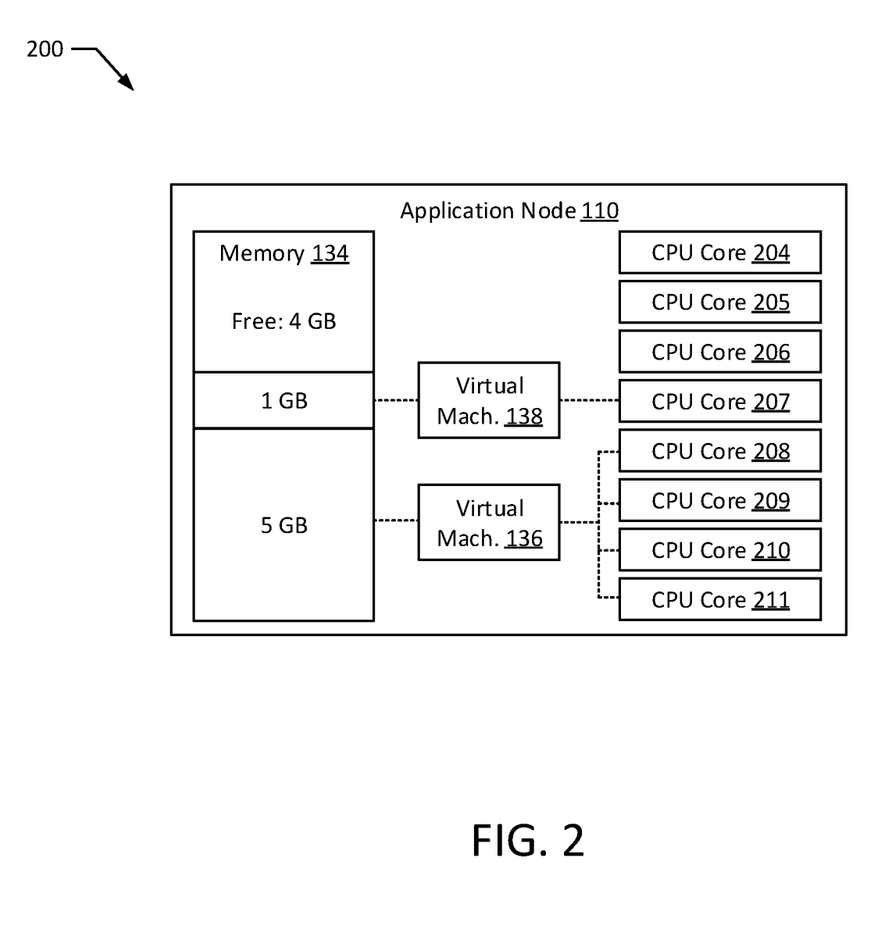
FIG. 2 illustrates a resource allocation for an application node according to an exemplary embodiment of the present disclosure.

FIG. 2 illustrates a resource allocation 200 for an application node 110 according to an exemplary embodiment of the present disclosure. The resource allocation 200 may illustrate exemplary allocations of computing hardware for execution of the virtual machines 136, 138 by the application node 110. In particular, the resource allocation 200 illustrates an exemplary allocation of the memory 134 and the processors 132 of the application node 110. The application node 110 as depicted includes 10 gigabytes (GB) of memory 134 and eight CPU cores 204-211. The memory 134 and the CPU cores 207-211 are allocated to execution of the virtual machines 136, 138 by the application node 110 (e.g., for use by the virtual machines 136, 138 while executing containers 140, 142, 144 and any associated applications). In particular, the virtual machine 138 is allocated one GB of the memory 202 and one CPU core 207 of the application node 110 and the virtual machine 136 is allocated five GB of memory 134 and four CPU cores 208-211 of the application node 110. For example, the virtual machine 136 includes two container 140, 142 and may therefore be allocated more CPU cores and/or more memory than the virtual machine 138, which includes a single container 144. These allocations leave the application node 110 with four GB of the memory 134 and three CPU cores 204-206 available for execution of other virtual machines (e.g., virtual machines created in response to requests received from client devices 102). In alternative allocations, more than one virtual machine may be allocated to the same CPU core.

Figure 3:
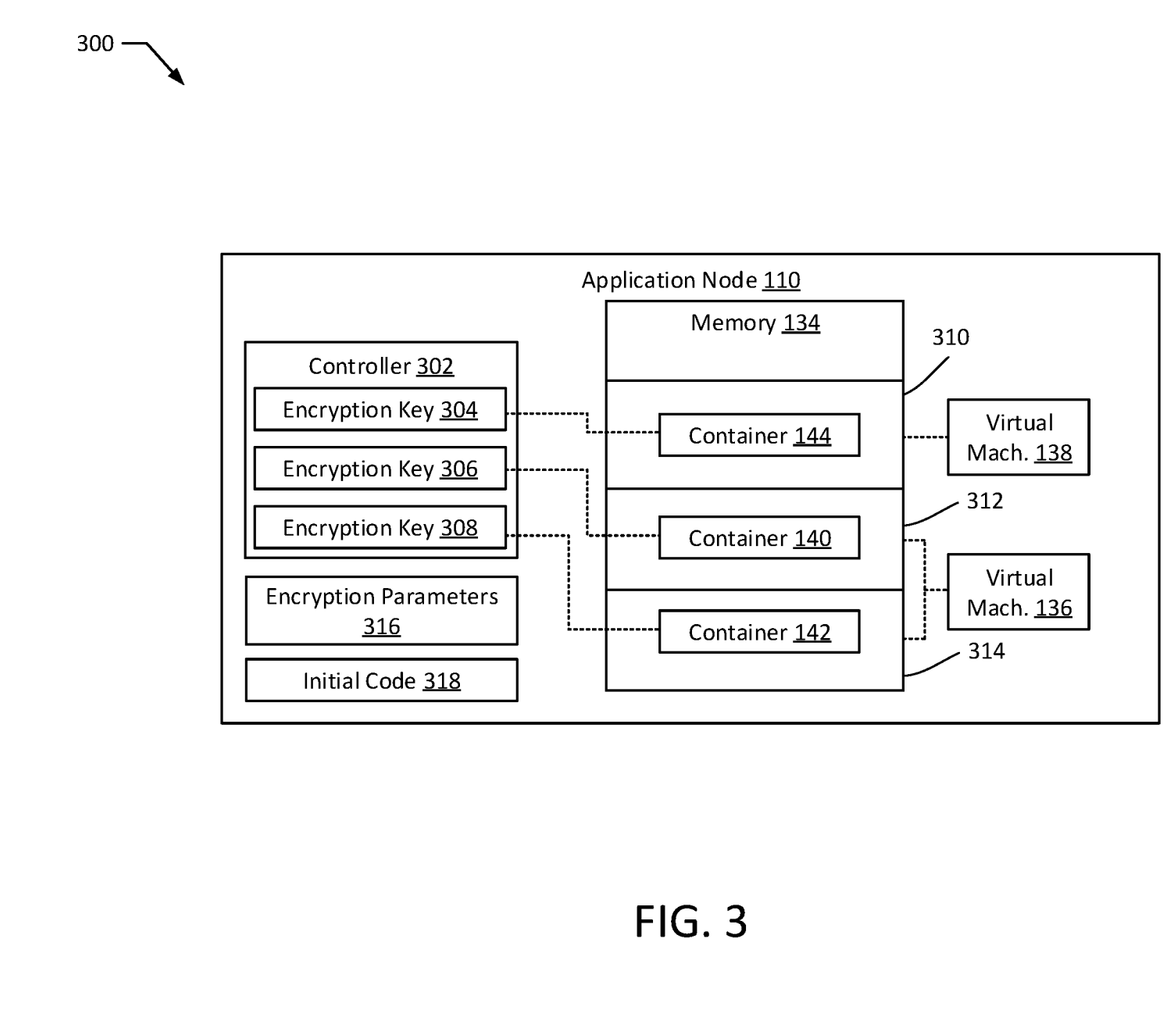
FIG. 3 illustrates an encrypted memory arrangement for an application node according to an exemplary embodiment of the present disclosure.

FIG. 3 illustrates an encrypted memory arrangement 300 for an application node according to an exemplary embodiment of the present disclosure. In the encrypted memory arrangement 300, the application node 110 includes a controller 302 associated with the memory 134. The controller 302 may be configured to manage encryption keys used to encrypt the contents of the memory 134. In certain implementations, the controller 302 may be implemented at least in part by the memory 134 itself (e.g., by a hardware controller and/or a trusted platform module included within the memory 134). As depicted, the controller 302 stores encryption keys 304, 306, 308 for use in encrypting the contents of the memory 134. In particular, the encryption keys 304, 306, 308 may respectively be used to encrypt the containers 144, 140, 142. For example, the encryption keys 304, 306, 308 may be used to encrypt segments 310, 312, 314 of the memory 134 that correspond to the containers 144, 140, 142. The encryption keys 304, 306, 308 may be generated at least in part based on information received within the request 114C. For example, the request 114C may further include encryption parameters 316 and/or initial code 318 (e.g., in a payload of the request 114C). The encryption parameters 316 may specify a type of encryption protocol to use (e.g., secure hash algorithm (SHA), data encryption standard (DES), Rivest-Shamir-Adleman (RSA), advanced encryption standard (AES)). The encryption parameters 316 may also specify specific configurations (e.g., size/number of bits for the encryption keys) of the particular encryption protocol (e.g., SHA-256, AES-256). In such instances, the encryption key 304 used to encrypt the segment 310 of the memory 134 corresponding to the virtual machine 138 may be generated according to the protocol and/or configuration specified in the encryption parameters 316. In additional or alternative instances, the encryption key 304 may be generated as a key pair associated with the virtual machine 138 (e.g., a public key and a private key generated according to an encryption protocol specified in the encryption parameters).

In certain instances, the encryption parameters 316 may be generated by the security coordinator 104 prior to transmitting the request 114B. For example, the encryption parameters 316 may be generated to designate predetermined encryption protocols and/or configurations (e.g., based on one or more of the type of application 116A, an entity associated with the client device, and/or the encryption capabilities of the controller 302 and/or the memory 134). In such instances, the encryption parameters 316 may be generated to include a certificate (e.g., a transport layer security (TLS) certificate) issued by a trusted certificate authority that is uniquely associated with the security coordinator 104 (e.g., a user account, device identifier, and/or network identifier associated with the security coordinator). In such instances, the application node 110 may validate the received certificate prior to generating the encryption key 304.

To encrypt the memory 134, the encryption keys 304, 306, 308 may be used to encrypt the contents of the memory when stored and to decrypt the contents of the memory when accessed. For example, the controller 302 may control access to the data stored within the memory 134 (e.g., all data stored to or retrieved from the memory 134 may go through the controller 302). In particular, the controller 302 to decrypt data received by the memory with a corresponding encryption key 304, 306, 308 prior to storage within the segments 310, 312, 314 and may encrypt data retrieved from the memory with a corresponding encryption key 304, 306, 308 after retrieval from the segments 310, 312, 314. Accordingly, to properly store and manipulate data within the memory 134, it may be necessary to encrypt the data using the encryption keys 304, 306, 308 prior to providing the data to the memory 134. As explained further below, after encrypting the memory 134, the application may execute the initial code 318. For example, the initial code 318 may specify instructions to be executed to test and verify the encryption of the segment 310 of the memory 134 allocated to the virtual machine 138 and/or to verify the encryption of the portion of the storage 135 allocated to the virtual machine 138.

Figure 4:
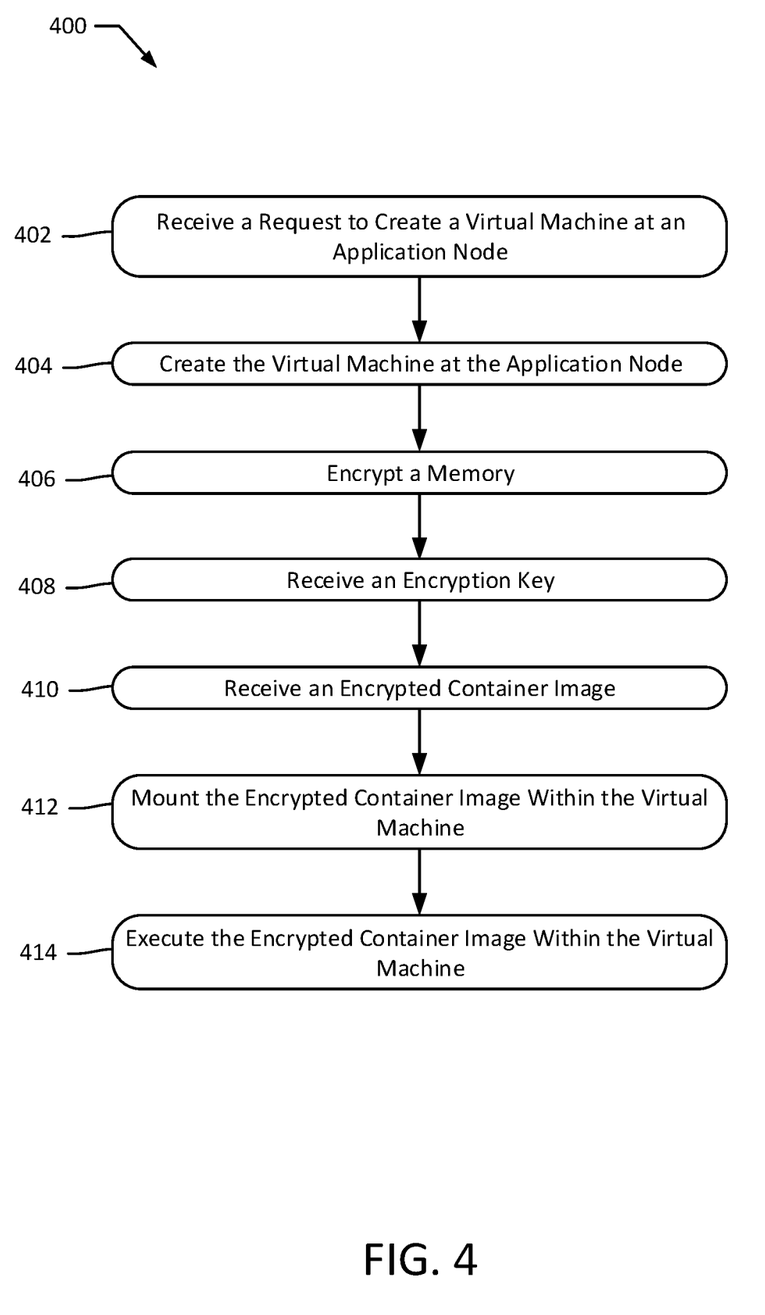
FIG. 4 illustrates a flow chart of a method for creating encrypted containers for execution of applications according to an exemplary embodiment of the present disclosure.

FIG. 4 illustrates a method 400 for creating encrypted containers for execution of applications according to an exemplary embodiment of the present disclosure. The method 400 may be implemented by a computer system, such as the system 100. For example, the method 400 may be implemented by an application node 110, 112. The method 400 may also be implemented by a set of instructions stored on a computer readable medium that, when executed by a processor, cause the computer system to perform the method 400. For example, all or part of the method 400 may be implemented by at least a portion of the processor(s) 132 and the memory 134. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method 400 may begin with receiving a request to create a virtual machine at an application node (block 402). For example, an application node 110 may receive a request 114C to create a virtual machine 138. The request 114C may be received from a security coordinator 104, which may have received the request 114C from a client device 102. The request 114C may specify an application 116A for execution and may also identify one or both of a firmware 118 and a kernel 120 required for execution of the application 116A. The request 114C may also specify that the application 116A requires encrypted memory. Further, in certain instances, the request 114C may include encryption parameters 316 and/or initial code 318, as discussed above.

A virtual machine may be created at the application node (block 404). For example, the application node 110 may create the virtual machine 138 requested by the request 114C. For example, the application node 110 may create the virtual machine 138 by allocating portions of the processor(s) 132, the memory 134, and/or the storage 135 to the virtual machine 138. In particular, in certain instances, creating the virtual machine 138 may include initializing execution of the virtual machine 138 (e.g., according to a virtualization protocol such as the Red Hat® Virtualization platform). Creating the virtual machine 138 may also include reserving the portions of the storage 135 and/or the memory 134 for use by the virtual machine 138. The portions of the storage 135 may be encrypted (e.g., using a private key associated with the virtual machine 138). In certain instances, execution of the virtual machine 138 may then be paused.

A memory may be encrypted (block 406). For example, the application node 110 may encrypt the portions of the memory 134 allocated to the virtual machine 138. The memory 134 may be encrypted by a controller 302 using encryption keys 304, 306, 308. For example, the application node 110 may provide initial code 318 and/or encryption parameters 316 (e.g., received from the request 114C) to the controller 302. As described further above, the controller 302 may generate an encryption key 304 based on the initial code 318 and/or the encryption parameters 316. When creating the virtual machine 138, the application node 110 may also, in certain instances, encrypt the portions of the storage 135 allocated to the virtual machine 138. For example, the storage 135 may be encrypted with an encryption key generated based on the initial code 318 and/or encryption parameters 316. However, in certain instances, the encryption key used to encrypt the storage 135 may not be generated by a controller 302 associated with the memory 134. Instead, the encryption key used to encrypt the storage 135 may be generated by the application node 110 while allocating the portions of the storage 135 for the virtual machine 138. For example, the application node 110 may generate the encryption key for the storage 135 using one or more block-based systems (e.g., Linux Unified Key Setup system, dm-crypt system) or file system-based systems (e.g., ecryptfts). Once the application node 110 has created the virtual machine 138 and encrypted the portions of the memory 134 and/or storage 135 associated with the virtual machine, the application node 110 may generate an attestation 122. For example, the attestation 122 may be generated based on the encryption parameters 316 and a public key associated with the virtual machine 138. As a specific example, and as discussed further above, the attestation 122 may be generated according to one or more cryptographic certification protocols, such as the X.509 protocols.

An encryption key may be received (block 408). For example, the application node 110 may receive an encryption key 124 from the security coordinator 104. An encrypted container image may be received (block 410). For example, the application node 110 may receive an encrypted image 146 from the encrypted registry 106. The encrypted image 146 may be generated based on a container image 148 that corresponds to the request 114Be received from the client device 102 by the security coordinator 104. For example, as explained earlier, the encryption key 124 may also be used by the encrypted registry 106 to encrypt the container image 148 and generate the encrypted image 146.

The encrypted container image may be mounted within the virtual machine (block 412). For example, the application node 110 may mount the encrypted image 146 within the virtual machine 138. In particular, the application node 110 may mount the encrypted image within the virtual machine 138 to create the container 144 that will execute the application 116A specified in the request 114C from the client device. To mount the encrypted image 146, the application node 110 may first decrypt the encrypted image 146. For example, the application node 110 may decrypt the encrypted image 146 using the encryption key 124 received from the security coordinator 104 and used by the encrypted registry 106 to generate the encrypted image 146. In particular, the application node 110 may decrypt the container image 146 by injecting the encryption key 124 into portions of the memory 134 associated with the virtual machine 138 (e.g., storing the encryption key 124 in association with the portions of the memory). The encrypted image 146 may then be stored on the corresponding portions of the memory 134. The injected encryption key 124 may accordingly decrypt the encrypted image 146 such that the memory 134 receives a copy of the decrypted container image 148 for execution.

The encrypted container image may be executed within the virtual machine (block 414). For example, the application node 110 may execute the encrypted image 146 within the virtual machine 138. In particular, the application of 110 may execute the container image 148 received from the encrypted image 146 and mounted within the virtual machine 138. For example, the container image 148 may be executed by executing one or more instructions contained within the container image 148 using processing cores allocated to the virtual machine 138.

By performing the method 400, the application node 110 may be able to both securely receive container images from the encrypted registry for execution and to secure the data and the contents of memory and storage during execution of a container. Accordingly, the method 400 improves the security of applications executing within a cloud computing environment. In particular, by encrypting the portions of memory and storage assigned to particular containers using encryption keys specifically associated with the particular containers, the method 400 prevents unauthorized applications from accessing data stored in the portions of memory and storage associated with other entities and/or other containers.

Figure 5:
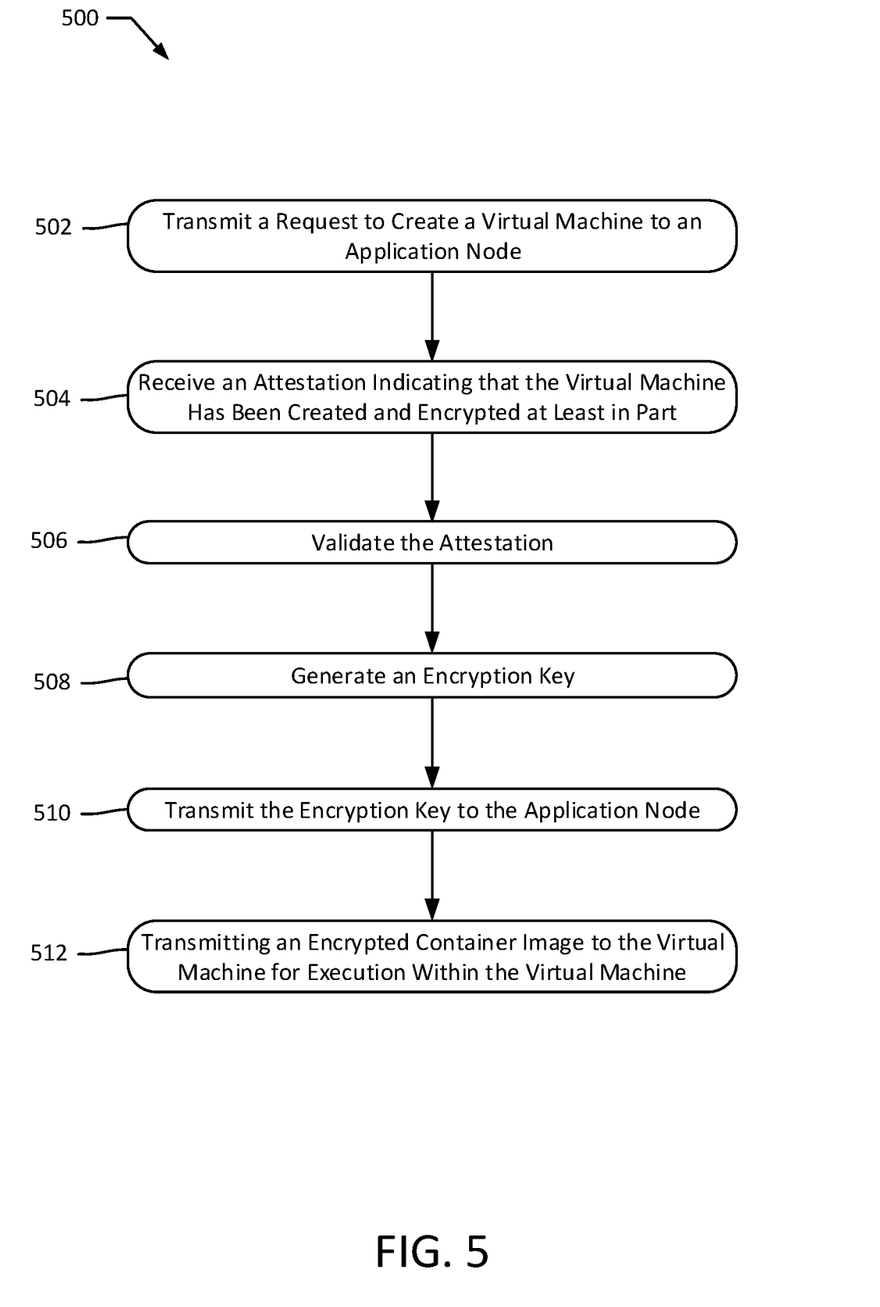
FIG. 5 illustrates a flow chart of a method for creating and validating encrypted containers for execution of applications according to an exemplary embodiment of the present disclosure.

FIG. 5 illustrates a method 500 for creating and validating the creation of encrypted containers for execution of applications according to an exemplary embodiment of the present disclosure. The method 500 may be implemented by a computer system, such as the system 100. For example, the method 500 may be implemented by the security coordinator 104, the encrypted registry 106, and/or the registry 108. The method 500 may also be implemented by a set of instructions stored on a computer readable medium that, when executed by a processor, cause the computer system to perform the method 500. For example, all or part of the method 500 may be implemented by at least a processor and/or a memory of the security coordinator 104, the encrypted registry 106, and/or the registry 108. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

The method 500 begins with transmitting a request to create a virtual machine to an application node (block 502). For example, the security coordinator 104 may transmit the request 114B received from the client device 102 to the application node 110. In certain instances, the security coordinator 104 may select the application node to receive the request 114B to be an application node with sufficient available resources (e.g., sufficient available processor(s) 132, memory 134, and/or storage 135). For example, the request 114B may further include a resource constraint for execution of the application 116A (e.g., a minimum amount of processing cores, a type of processing cores, a minimum amount of memory 134, a minimum amount of storage 135, a type of storage 135). The application node 110 may be identified as an application node with sufficient available resources to fulfill the resource constraint. Additionally or alternatively, the application node 110 may, at least in part, be selected as an application node that includes memory 134 that supports hardware encryption (e.g., that includes a controller 302), including protocols such as Total Memory Encryption by Intel® and Secure Encrypted Virtualization by AMD®.

An attestation may be received that indicates the virtual machine has been created and encrypted at least in part (block 504). For example, the security coordinator 104 may receive an attestation 122 from the application node 110. As explained previously, the application node 110 may generate the attestation after creating the virtual machine 138 (e.g., after creating the virtual machine 138 and encrypting at least one of the portions of the memory 134 and the storage 135 allocated to the virtual machine 138). The attestation may be validated (block 506). For example, the security coordinator 104 may validate the attestation 122. As a specific example, the security coordinator 104 may identify and verify a certificate included within the attestation 122. In particular, to generate the attestation, the application node 110 may create a certificate based on the initial code 318 and/or the encryption key used to encrypt the storage 135 and/or the memory 134.

An encryption key may be generated (block 508). For example, the security coordinator may generate an encryption key 124 for use in encrypting the container image 148. The encryption key 124 may be generated according to one or more symmetric and/or asymmetric encryption techniques. For example, the encryption key 124 may be generated according to the secure hash algorithm (SHA), message-digest algorithm (MD), and the like. The encryption key may be transmitted to the application node (block 510). For example, the security coordinator 104 may transmit the encryption key 124 to the application node 110. In certain implementations, the encryption key 124 may be transmitted in response to receiving and validating the attestation 122. In additional or alternative implementations, the encryption key 124 may be transmitted before receiving and/or validating the attestation 122. For example, the encryption key 124 may be transmitted with the request 114B.

An encrypted container image may be transmitted to the virtual machine for execution within the virtual machine (block 512). For example, an encrypted image 146 may be transmitted to the application node 110 for execution within the virtual machine 138. In particular, as explained above, the security coordinator may transmit an encryption request 126 to the encrypted registry 106. In response, the encrypted registry 106 may identify a container image 148 within the registry 108 that corresponds to the request 114B. For example, the container 148 may be identified based on metadata 150 that includes an application 116C, a firmware, and/or a kernel 120 that matches or corresponds to the application 116A, firmware 118, and/or kernel 120 of the request 114A.

In certain implementations, after transmitting the encrypted container image, the security coordinator 104 may receive a VM identifier 130 from the application node 110 identifying the virtual machine 138 used to execute the encrypted container image. The security coordinator 104 may then create and transmit a result 128 to the client device 102 indicate that the request 114A was successfully fulfilled using an encrypted virtual machine 138. For example, the result 128 may include the VM identifier 130 and the attestation 122.

By performing the method 500, the security coordinator 104, encrypted registry 106, and the registry 108 may be enabled to securely identify and provide encrypted container images to the application node 110 for execution. Furthermore, the security coordinator 104 may be able to request and verify that the application node 110 has created a virtual machine 138 with encrypted memory 134 and/or storage 135. Accordingly, as with the method 400, the method 500 improves the security of applications executing within a cloud computing environment. In particular, by encrypting the portions of memory and storage assigned to particular containers using encryption keys specifically associated with the particular containers, the method 500 prevents unauthorized applications from accessing data stored in the portions of memory and storage associated with other entities and/or other containers.

Figure 6:
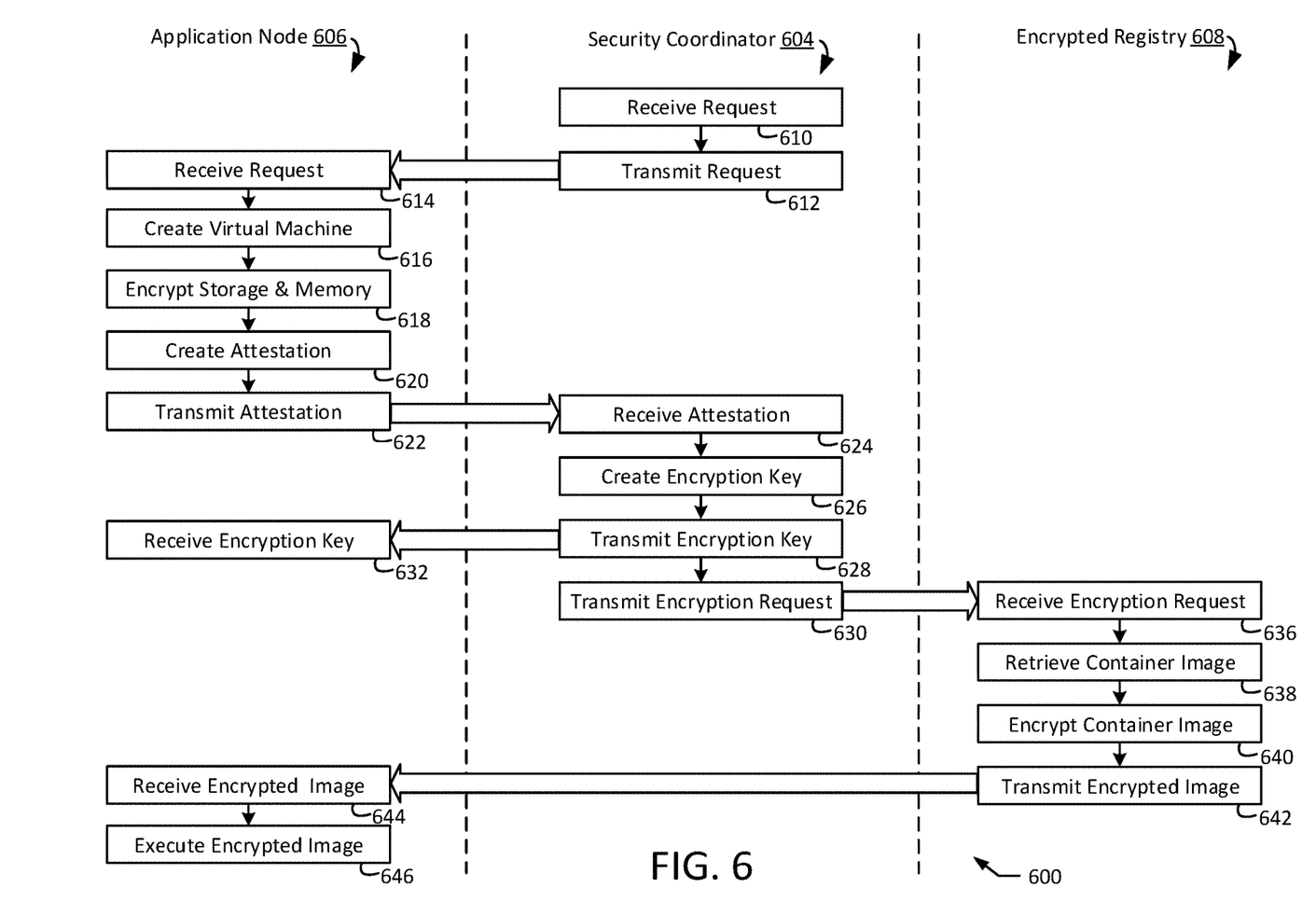
FIG. 6 illustrates a flow diagram of a method for creating encrypted containers for execution of applications according to an exemplary embodiment of the present disclosure.

FIG. 6 illustrates a method 600 for creating encrypted containers for execution of applications according to an exemplary embodiment of the present disclosure. The method 600 may be implemented by a computer system, such as the system 100. In particular, the method 600 includes an application node 606, which may be an exemplary implementation of the application nodes 110, 112, a security coordinator 604, which may be an exemplary implementation of the security coordinator 104, and an encrypted registry 608, which may be an exemplary implementation of the encrypted registry 608. The method 600 may also be implemented by a set of instructions stored on a computer readable medium that, when executed by a processor, cause the computer system to perform the method 600. For example, all or part of the method 600 may be implemented by at least a processor and/or a memory of the security coordinator 604, the encrypted registry 608, the registry 108, and/or the application node 606. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

The method 600 may begin with the security coordinator 604 receiving a request 114B (block 610). For example, the security coordinator 604 may receive a request 114B from a client device 102. The request 114B may specify one or more of an application 116A for execution, a firmware 118, and a kernel 120. The security coordinator 604 may transmit the request 114B to the application node 606 (block 612). As explained above, the application node 606 may be one of multiple application nodes within a cloud computing environment and the security coordinator 604 may select the application node 606 based on the computing resources available within the application node 606 (e.g., one or more of an available processor(s) 132, memory 134, and storage 135).

The application node 606 may receive the request 114B (block 614). In response to receiving the request 114B, the application node 606 may create a virtual machine 138 (block 616). For example, the application node 606 may create a virtual machine 138 by allocating portions of the processor(s) 132, the memory 134, and/or the storage 135 for use by the virtual machine 138. The application node 606 may encrypt a storage space and a memory of the virtual machine 138 (block 618). For example, the portions of the memory 134 allocated to the virtual machine 138 may be encrypted by a controller 302 associated with the memory 134. In particular, as explained above, the request 114C received by the application node 110 may include encryption parameters 316 and/or initial code 318. The controller 302 may encrypt the portions of the memory 134 allocated to the virtual machine 138 using an encryption key 304 generated based on the encryption parameters 316. As another example, the portions of the storage 135 allocated to the virtual machine 138 may be encrypted using an encryption key different from the encryption key 304 used to encrypt the memory 134.

The application node 606 may create an attestation (block 620). For example, the application node 606 may generate the attestation using one or more techniques discussed above to computationally prove that the virtual machine 138 was successfully created and that the storage 135 and the memory 134 were successfully encrypted. As a specific example, after encrypting the storage 135 and the memory 134, the application node 110 may execute the initial code 318 within the virtual machine 138. For instance, the initial code may specify operations to test and verify that the storage 135 and/or the memory 134 were encrypted according to the encryption parameters 316. The application node 606 may transmit the attestation to the security coordinator 604 (block 622).

The security coordinator 604 may receive the attestation (block 624). After receiving the attestation, the security coordinator 604 may validate the attestation, as discussed above. The security coordinator 604 may create an encryption key 124 (block 626). As explained above, the encryption key 124 may be generated according to a symmetric and/or asymmetric encryption protocol. The security coordinator 604 transmit the encryption key 124 to the application node 606 (block 628) and the application node 606 may receive the encryption key 124 (block 632). The security coordinator 604 may also transmit an encryption request 126 (block 630). For example, the security coordinator 604 may create the encryption request 126 to include the encryption key 124 and all or part of the request 114B (e.g., the application 116A, the firmware 118, and/or the kernel 120).

The encrypted registry 608 may receive the encryption request 126 (block 636) and may retrieve a container image 148 (block 638). For example, the encrypted registry 608 may identify, within a registry 108, a container image 148 that corresponds to the request 114B using the information included within the encryption request 126 (e.g., the same application 116C, the same firmware 118, and/or the same kernel 120). The encrypted registry 608 may encrypt the container image 148 (block 640). For example, the encrypted registry 608 may encrypt the container image 148 using the encryption key 124 included within the encryption request 126 to generate the encrypted image 146.

The encrypted registry 608 may then transmit the encrypted image 146 (block 642) and the application node 606 may receive the encrypted image 146 (block 644). The application node 606 may then execute the encrypted image 146 (block 646). For example, the application node 606 may decrypt the encrypted image 146 using the encryption key 124 received a block 632 in order to access the container image 148. The application node 606 may then mount the container image 148 for execution within the virtual machine 138 created a block 616. For example, the application node 606 may perform one or both of the blocks 412, 414 of the method 400 to mount and execute the container image 148.

The method 600 includes multiple instances of transmitting and/or receiving data (e.g., blocks 612, 614, 622, 624, 628, 632, 630, 636, 642, 644). Transmission and/or receiving of data may occur over various communicative interfaces. For example, where one or more of the application node 606, security coordinator 604, and encrypted registry 608 are implemented by the same computing device, transmitting and/or receiving data may occur via a communications bus or other internal communications interface within the computing device. Additionally or alternatively, transmitting or receiving of data may occur via a network, such as a local network (e.g., a local network within a server rack and/or facility) and a public network (e.g., the internet).

Figure 7:
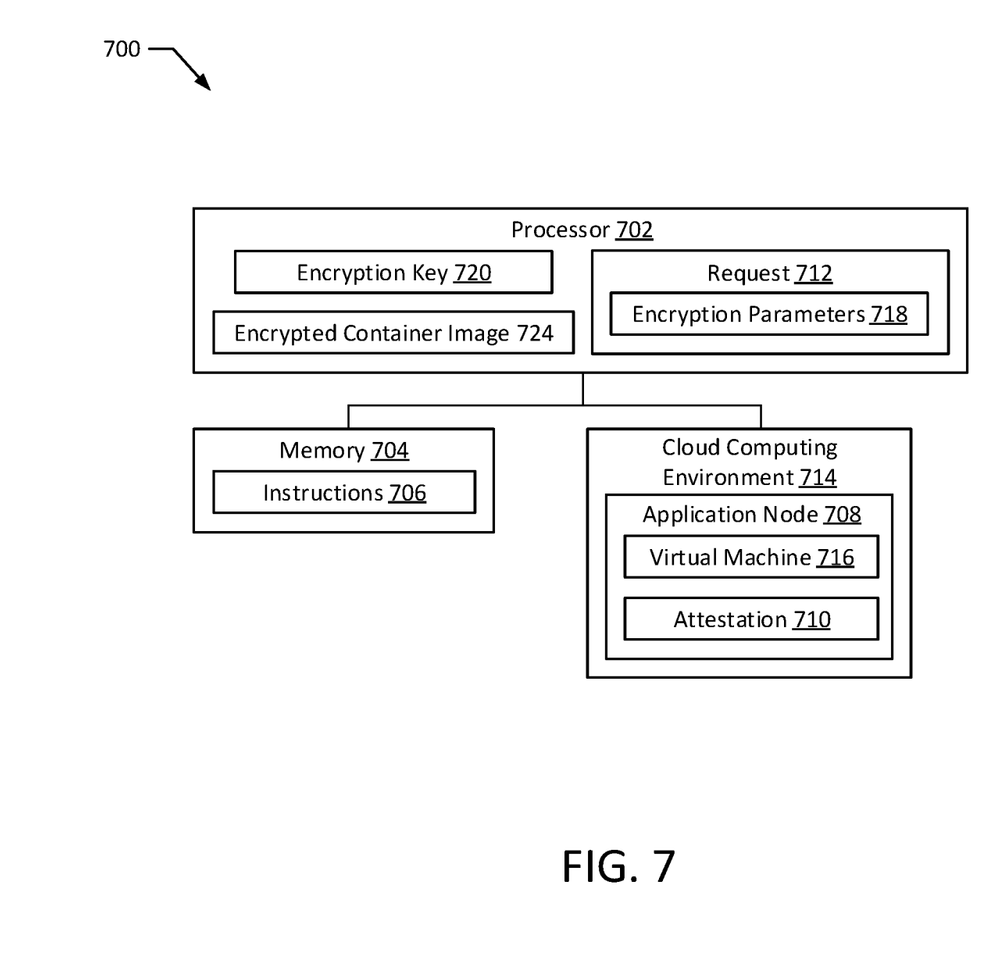
FIG. 7 illustrates a system according to an exemplary embodiment of the present disclosure.

FIG. 7 illustrates a system 700 according to an exemplary embodiment of the present disclosure. The system 700 includes a processor 702 and a memory 704. The memory 704 stores instructions 706 which, when executed by the processor 702, cause the processor 702 to transmit, to an application node 708 of a cloud computing environment 714, a request 712 to create a virtual machine 716 at the application node, the request 712 containing encryption parameters 718 for use in encrypting the virtual machine 716. The instructions 706 may also cause the processor to receive, from the application node 708, an attestation 710 indicating that the virtual machine 716 has been created and encrypted, at least in part, and to validate the attestation 710. The instructions 706 may further cause the processor 702 to generate an encryption key 720. The instruction 706 may still further cause the processor 702 to transmit the encryption key 720 to the application node 708 and transmit, to the virtual machine 716, an encrypted container image 724 for execution within the virtual machine 716.

Aspects of the subject matter described herein may be useful alone or in combination with one or more aspects described herein. In a first aspect, a method is provided that includes receiving, at an application node of a cloud computing environment, a request to create a virtual machine at the application node, the request containing encryption parameters for use in encrypting the virtual machine. The virtual machine may be created at the application node and may include an associated memory for use during execution of the virtual machine. The method may further include receiving, at the application node, an encryption key, encrypting the memory, and receiving an encrypted container image, wherein the encrypted container image is encrypted using the encryption key. The encrypted container image may be mounted within the virtual machine and the encrypted container image may be executed within the virtual machine.

In a second aspect according to any of the previous aspects (e.g., the first aspect), creating the virtual machine includes initializing execution of the virtual machine and reserving storage space separate from the memory for use by the virtual machine. Creating the virtual machine may further include encrypting the storage space, reserving the memory for use by the virtual machine, encrypting the memory, and pausing execution of the virtual machine.

In a third aspect according to any of the previous aspects (e.g., the second aspect), the storage space is encrypted using a private key associated with the virtual machine.

In a fourth aspect according to any of the previous aspects (e.g., the first aspect), the method further includes, prior to receiving the encryption key, generating an attestation based on the encryption parameters and a public key associated with the virtual machine and transmitting the attestation to a security coordinator. The security coordinator may transmit the encryption key to the application node in response to receiving and verifying the attestation.

In a fifth aspect according to any of the previous aspects (e.g., the fourth aspect), the security coordinator further transmits the encryption key to a secure registry for use in encrypting the encrypted container image.

In a sixth aspect according to any of the previous aspects (e.g., the first aspect), encrypting the memory includes storing the encryption key in association with the memory.

In a seventh aspect according to any of the previous aspects (e.g., the sixth aspect), mounting the container image includes decrypting the encrypted container image using the encryption key and storing the encrypted container image.

In an eighth aspect according to any of the previous aspects (e.g., the first aspect), the encryption key is received from a security coordinator. The encryption key may be generated based on a private key associated with at least one of the virtual machine and the memory.

In a ninth aspect according to any of the previous aspects (e.g., the first aspect), the request is received from a client device external to the cloud computing environment.

In a tenth aspect according to any of the previous aspects (e.g., the ninth aspect), the request is received by a security coordinator configured to generate the encryption parameters before transmitting the request including the encryption parameters to the application node.

In an eleventh aspect according to any of the previous aspects (e.g., the tenth aspect), the encryption parameters include a certificate uniquely associated with the security coordinator.

In a twelfth aspect according to any of the previous aspects (e.g., the ninth aspect), the method further includes transmitting an alert to the client device after beginning execution of the container image.

In a thirteenth aspect according to any of the previous aspects (e.g., the first aspect), the request specifies one or both of a firmware and a kernel to be implemented by the virtual machine.

In a fourteenth aspect a system is provided that includes a processor and a memory. The memory may store instructions which, when executed by the processor, cause the processor to receive, at an application node of a cloud computing environment, a request to create a virtual machine at the application node, the request containing encryption parameters for use in encrypting the virtual machine. The memory may store further instructions which, when executed by the processor, cause the processor to create, at the application node, the virtual machine, the virtual machine including an associated memory for use during execution of the virtual machine. The memory may also store instructions which, when executed by the processor, cause the processor to receive, at the application node, an encryption key, encrypt the memory, and receive an encrypted container image, wherein the encrypted container image is encrypted using the encryption key. The memory may store still further instructions which, when executed by the processor, cause the processor to mount the encrypted container image within the virtual machine and execute the encrypted container image within the virtual machine.

In a fifteenth aspect according to any of the previous aspects (e.g., the fourteenth aspect), the memory stores further instructions which, when executed by the processor while creating the virtual machine, cause the processor to initialize execution of the virtual machine and reserve storage space separate from the memory for use by the virtual machine. The memory may store still further instructions which, when executed by the processor while creating the virtual machine, cause the processor to encrypt the storage space, reserve the memory for use by the virtual machine, encrypt the memory, and pause execution of the virtual machine.

In a sixteenth aspect according to any of the previous aspects (e.g., the fifteenth aspect), the storage space is encrypted using a private key associated with the virtual machine.

In a seventeenth aspect according to any of the previous aspects (e.g., the fourteenth aspect), the memory stores still further instructions which, when executed by the processor prior to receiving the encryption key, cause the processor to generate an attestation based on the encryption parameters and a public key associated with the virtual machine and transmit the attestation to a security coordinator. The security coordinator may transmit the encryption key to the application node in response to receiving and verifying the attestation.

In an eighteenth aspect according to any of the previous aspects (e.g., the seventeenth aspect, the security coordinator further transmits the encryption key to a secure registry for use in encrypting the encrypted container image.

In a nineteenth aspect according to any of the previous aspects (e.g., the fourteenth aspect), encrypting the memory comprises storing the encryption key in association with the memory.

In a twentieth aspect according to any of the previous aspects (e.g., the nineteenth aspect), the memory stores further instructions which, when executed by the processor while mounting the container image, cause the processor to decrypt the encrypted container image using the encryption key and store the encrypted container image.

In a twenty-first aspect according to any of the previous aspects (e.g., the fourteenth aspect), the encryption key is received from a security coordinator. The encryption key may be generated based on a private key associated with at least one of the virtual machine and the memory.

In a twenty-second aspect according to any of the previous aspects (e.g., the fourteenth aspect), the request is received from a client device external to the cloud computing environment.

In a twenty-third aspect according to any of the previous aspects (e.g., the twenty-third aspect), the request is received by a security coordinator configured to generate the encryption parameters before transmitting the request including the encryption parameters to the application node.

In a twenty-fourth aspect according to any of the previous aspects (e.g., the twenty-third aspect), the encryption parameters include a certificate uniquely associated with the security coordinator.

In a twenty-fifth aspect according to any of the previous aspects (e.g., the twenty-second aspect), the memory stores further instructions which, when executed by the processor, cause the processor to transmit an alert to the client device after beginning execution of the container image.

In a twenty-sixth aspect according to any of the previous aspects (e.g., the fourteenth aspect), the request specifies one or both of a firmware and a kernel to be implemented by the virtual machine.

In a twenty-seventh aspect, a non-transitory, computer-readable medium storing instructions which, when executed by a processor, cause the processor to receive, at an application node of a cloud computing environment, a request to create a virtual machine at the application node, the request containing encryption parameters for use in encrypting the virtual machine. The non-transitory, computer-readable medium may store further instructions which, when executed by a processor, cause the processor to create, at the application node, the virtual machine, the virtual machine including an associated memory for use during execution of the virtual machine. The non-transitory, computer-readable medium may also store instructions which, when executed by a processor, cause the processor to receive, at the application node, an encryption key, encrypt the memory, and receive an encrypted container image. The encrypted container image may be encrypted using the encryption key. The non-transitory, computer-readable medium may store still further instructions which, when executed by a processor, cause the processor to mount the encrypted container image within the virtual machine and execute the encrypted container image within the virtual machine.

In a twenty-eighth aspect, a system is provided that includes a virtual machine creation means configured to receive, at an application node of a cloud computing environment, a request to create a virtual machine at the application node, the request containing encryption parameters for use in encrypting the virtual machine and create, at the application node, the virtual machine, the virtual machine including an associated memory for use during execution of the virtual machine. The system may also include a node encryption means configured to receive an encryption key and encrypt the memory. The system may further include an image mounting means configured to receive an encrypted container image, wherein the encrypted container image is encrypted using the encryption key and mount the encrypted container image within the virtual machine. The system may still further include an image execution means configured to execute the encrypted container image within the virtual machine.

In a twenty-ninth aspect, a method is provided that includes transmitting, to an application node of a cloud computing environment, a request to create a virtual machine at the application node, the request containing encryption parameters for use in encrypting the virtual machine. The method may also include receiving, from the application node, an attestation indicating that the virtual machine has been created and encrypted at least in part and validating the attestation. The method may further include generating an encryption key and transmitting the encryption key to the application node. The method may still further include transmitting, to the virtual machine, an encrypted container image for execution within the virtual machine.

In a thirtieth aspect according to any of the previous aspects (e.g., the twenty-ninth aspect), the method further includes, prior to transmitting the request, receiving the request from a client device external to the cloud computing environment.

In a thirty-first aspect according to any of the previous aspects (e.g., the thirtieth aspect), the method further includes generating the encryption parameters before transmitting the request including the encryption parameters to the application node.

In a thirty-second aspect according to any of the previous aspects (e.g., the thirty-first aspect), the encryption parameters include a certificate uniquely associated with a security coordinator from which the request is transmitted to the application node.

In a thirty-third aspect according to any of the previous aspects (e.g., the twenty-ninth aspect), the method further includes, prior to transmitting the encrypted container image, retrieving, from a registry, a container image and encrypting the container image with the encryption key to generate the encrypted container image.

In a thirty-fourth aspect according to any of the previous aspects (e.g., the twenty-ninth aspect), the attestation indicates that at least a storage space associated with the virtual machine has been encrypted.

In a thirty-fifth aspect according to any of the previous aspects (e.g., the twenty-ninth aspect), the encryption key is generated based on a private key associated with at least one of the virtual machine and the memory.

In a thirty-sixth aspect according to any of the previous aspects (e.g., the twenty-ninth aspect), encrypting the memory comprises storing a second encryption key in association with the memory.

In a thirty-seventh aspect according to any of the previous aspects (e.g., the twenty-ninth aspect), the application node is one of a plurality of application nodes within the cloud computing environment. The method may further includes determining that the application node includes memory compatible with encryption techniques.

In a thirty-eighth aspect according to any of the previous aspects (e.g., the twenty-ninth aspect), the request specifies one or both of a firmware and a kernel to be implemented by the virtual machine.

In a thirty-ninth aspect, a system is provided that includes a processor and a memory. The memory may store instructions which, when executed by the processor, cause the processor to transmit, to an application node of a cloud computing environment, a request to create a virtual machine at the application node, the request containing encryption parameters for use in encrypting the virtual machine. The memory may also store instructions which, when executed by the processor, cause the processor to receive, from the application node, an attestation indicating that the virtual machine has been created and encrypted at least in part and validate the attestation. The memory may store further instructions which, when executed by the processor, cause the processor to generate an encryption key and transmit the encryption key to the application node. The memory may store still further instructions which, when executed by the processor, cause the processor to transmit, to the virtual machine, an encrypted container image for execution within the virtual machine.

In a fortieth aspect according to any of the previous aspects (e.g., the thirty-ninth aspect), the memory stores further instructions which, when executed by the processor, cause the processor to, prior to transmitting the request, receive the request from a client device external to the cloud computing environment.

In a forty-first aspect according to any of the previous aspects (e.g., the fortieth aspect), the memory stores further instructions which, when executed by the processor, cause the processor to generate the encryption parameters before transmitting the request including the encryption parameters to the application node.

In a forty-second aspect according to any of the previous aspects (e.g., the forty-first aspect), the encryption parameters include a certificate uniquely associated with a security coordinator from which the request is transmitted to the application node.

In a forty-third aspect according to any of the previous aspects (e.g., the thirty-ninth aspect), the memory stores further instructions which, when executed by the processor, cause the processor to, prior to transmitting the encrypted container image retrieve, from a registry, a container image and encrypt the container image with the encryption key to generate the encrypted container image.

In a forty-fourth aspect according to any of the previous aspects (e.g., the thirty-ninth aspect), the attestation indicates that at least a storage space associated with the virtual machine has been encrypted.

In a forty-fifth aspect according to any of the previous aspects (e.g., the thirty-ninth aspect), the encryption key is generated based on a private key associated with at least one of the virtual machine and the memory.

In a forty-sixth aspect according to any of the previous aspects (e.g., the thirty-ninth aspect), the memory stores further instructions which, when executed by the processor while encrypting the memory, cause the processor to store a second encryption key in association with the memory.

In a forty-seventh aspect according to any of the previous aspects (e.g., the thirty-ninth aspect), the application node is one of a plurality of application nodes within the cloud computing environment. The memory may store further instructions which, when executed by the processor while determining that the application node, cause the processor to determine that the application node includes memory compatible with encryption techniques.

In a forty-eighth aspect according to any of the previous aspects (e.g., the thirty-ninth aspect), the request specifies one or both of a firmware and a kernel to be implemented by the virtual machine.

In a forty-ninth aspect, a non-transitory, computer-readable medium is provided storing instructions which, when executed by a processor, cause the processor to transmit, to an application node of a cloud computing environment, a request to create a virtual machine at the application node, the request containing encryption parameters for use in encrypting the virtual machine. The non-transitory, computer-readable medium may also store instructions which, when executed by a processor, cause the processor to receive, from the application node, an attestation indicating that the virtual machine has been created and encrypted at least in part and validate the attestation. The non-transitory, computer-readable medium may store further instructions which, when executed by a processor, cause the processor to generate an encryption key and transmit the encryption key to the application node. The non-transitory, computer-readable medium may store still further instructions which, when executed by a processor, cause the processor to transmit, to the virtual machine, an encrypted container image for execution within the virtual machine.

In a fiftieth aspect, a system is provided that includes a request transmission means configured to transmit, to an application node of a cloud computing environment, a request to create a virtual machine at the application node, the request containing encryption parameters for use in encrypting the virtual machine. The system may also include an attestation validation means configured to receive, from the application node, an attestation indicating that the virtual machine has been created and encrypted at least in part and validate the attestation. The encryption key generation means configured to generate an encryption key, transmit the encryption key to the application node, and transmit, to the virtual machine, an encrypted container image for execution within the virtual machine.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
 receiving, at an application node of a cloud computing environment, a request to create a virtual machine at the application node, the request containing encryption parameters for use in encrypting the virtual machine;
 creating, at the application node, the virtual machine, the virtual machine including an associated memory for use during execution of the virtual machine;
 encrypting the memory;
 generating an attestation based on the encryption parameters and a public key associated with the virtual machine to indicate the virtual machine has been created and encrypted at least in part;
 transmitting the attestation to a security coordinator, wherein the security coordinator generates and transmits a first encryption key to the application node in response to receiving and verifying the attestation by the security coordinator;
 receiving, at the application node, the first encryption key;
 receiving an encrypted container image at the application node, wherein the encrypted container image is encrypted using the first encryption key;
 mounting the encrypted container image within the virtual machine; and
 executing the encrypted container image within the virtual machine.

2. The method of claim 1, wherein creating the virtual machine includes:
 initializing execution of the virtual machine;
 reserving storage space separate from the memory for use by the virtual machine;
 encrypting the storage space;
 reserving the memory for use by the virtual machine; and
 pausing execution of the virtual machine.

3. The method of claim 2, wherein the storage space is encrypted using a private key associated with the virtual machine.

4. The method of claim 1, wherein the security coordinator further transmits the first encryption key to a secure registry for use in encrypting the encrypted container image.

5. The method of claim 1, wherein encrypting the memory comprises storing a second encryption key in association with the memory, wherein the second encryption key is generated based on a private key associated with at least one of the virtual machine and the memory.

6. The method of claim 5, wherein mounting the container image includes:
 decrypting the encrypted container image using the first encryption key; and
 storing the encrypted container image in the virtual machine.

7. The method of claim 1, wherein the request is received from a client device external to the cloud computing environment.

8. The method of claim 7, wherein the request is received by the security coordinator configured to generate the encryption parameters before transmitting the request including the encryption parameters to the application node.

9. The method of claim 8, wherein the encryption parameters include a certificate uniquely associated with the security coordinator.

10. The method of claim 7, further comprising transmitting a response to the client device after beginning execution of the container image.

11. The method of claim 1, wherein the request specifies one or both of a firmware and a kernel to be implemented by the virtual machine.

12. A system comprising:
 a processor; and
 a first memory storing instructions which, when executed by the processor, cause the processor to:
 transmit, to an application node of a cloud computing environment, a request to create a virtual machine at the application node, the request containing encryption parameters for use in encrypting the virtual machine;
 receive, at a security coordinator from the application node, an attestation indicating that the virtual machine has been created and encrypted at least in part;
 validate the attestation at the security coordinator;
 generate a first encryption key at the security coordinator in response to validating the attestation;
 transmit the first encryption key to the application node; and
 transmit, to the virtual machine, an encrypted container image which is encrypted by the first encryption key for execution within the virtual machine.

13. The system of claim 12, wherein the memory stores further instructions which, when executed by the processor, cause the processor to, prior to transmitting the request, receive the request from a client device external to the cloud computing environment.

14. The system of claim 13, wherein the memory stores further instructions which, when executed by the processor, cause the processor to generate the encryption parameters before transmitting the request including the encryption parameters to the application node.

15. The system of claim 14, wherein the encryption parameters include a certificate uniquely associated with the security coordinator from which the request is transmitted to the application node.

16. The system of claim 12, wherein the memory stores further instructions which, when executed by the processor, cause the processor to, prior to transmitting the encrypted container image:

retrieve, from a registry, a container image; and
encrypt the container image with the first encryption key to generate the encrypted container image.

17. The system of claim 12, wherein the application node is one of a plurality of application nodes within the cloud computing environment, and wherein the memory stores further instructions which, when executed by the processor while determining that the application node, cause the processor to determine that the application node includes memory compatible with encryption techniques.

18. A non-transitory, computer-readable medium storing instructions which, when executed by a processor, cause the processor to:
   transmit, to an application node of a cloud computing environment, a request to create a virtual machine at the application node, the request containing encryption parameters for use in encrypting the virtual machine;
   receive, at a security coordinator from the application node, an attestation indicating that the virtual machine has been created and encrypted at least in part;
   validate the attestation at the security coordinator;
   generate a first encryption key at the security coordinator in response to validating the attestation;
   transmit the first encryption key to the application node; and
   transmit, to the virtual machine, an encrypted container image which is encrypted by the first encryption key for execution within the virtual machine.

\* \* \* \* \*